United States Patent
Cudak et al.

(10) Patent No.: US 9,373,345 B1
(45) Date of Patent: Jun. 21, 2016

(54) PRO-ACTIVE PROTECTION OF COMMUNICATION DEVICES THAT ARE SENSTIVE TO VIBRATION OR SHOCK

(71) Applicant: International Business Machines Corporation, Armonk, NY (US)

(72) Inventors: Gary D. Cudak, Wake Forest, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/567,209

(22) Filed: Dec. 11, 2014

(51) Int. Cl.
*G11B 5/60* (2006.01)
*G11B 5/40* (2006.01)
*G11B 33/10* (2006.01)

(52) U.S. Cl.
CPC . *G11B 5/40* (2013.01); *G11B 33/10* (2013.01)

(58) Field of Classification Search
CPC ............ G06F 11/3409; G06F 11/3466; G06F 11/008; G06F 21/56; H05K 999/99; H04L 63/08; H04L 63/1416; G01V 1/28; G01V 1/30; G01V 1/008; E21B 47/12; E21B 47/00; E21B 14/56; G11B 5/40; G11B 33/10; G11B 5/3106; G11B 5/255
USPC ............. 714/47.1, 47.2; 702/15, 16; 340/690, 340/853.1; 726/2, 23, 34, 14; 360/235.6
See application file for complete search history.

(56) References Cited

U.S. PATENT DOCUMENTS

| | | | |
|---|---|---|---|
| 6,396,399 B1 | 5/2002 | Dunlap | |
| 7,693,663 B2 | 4/2010 | Friedlander et al. | |
| 8,412,238 B1 | 4/2013 | White et al. | |
| 8,495,256 B2 | 7/2013 | Gamble et al. | |
| 8,495,757 B2 * | 7/2013 | Russo | G06F 21/6209 713/151 |
| 8,930,775 B2 * | 1/2015 | Notohardjono | G06F 11/0793 714/47.2 |
| 2011/0121965 A1 | 5/2011 | Betts et al. | |
| 2012/0280823 A1 | 11/2012 | Yang | |

FOREIGN PATENT DOCUMENTS

JP 2011233197 A 11/2011
JP 2014081223 A 5/2014

(Continued)

OTHER PUBLICATIONS

Jeremy Hsu "'Quake Catcher' Software Converts Laptops Worldwide into Earthquake Sensor Network", Popular Science, Magazine, CES 2014, http://www.popsci.com/technology/article/2010-03/quake-catcher-software, Mar. 12, 2010, 3 pages.

(Continued)

*Primary Examiner* — Nabil Hindi
(74) *Attorney, Agent, or Firm* — Jeffrey L. Streets

(57) ABSTRACT

A communication device includes a vibroscope or an accelerometer for detecting vibration or shock, a hard disk drive for storing data, and a wireless communication transceiver. In response to detecting vibration or shock, the communication device automatically broadcasts an alert message that identifies a physical location of the communication device at the time that the vibration or shock is sensed. In response to receiving an alert message from another communication device, the communication device automatically temporarily parks a read-write head of the hard disk drive to prevent damage from the vibration or shock.

5 Claims, 7 Drawing Sheets

(56) References Cited

FOREIGN PATENT DOCUMENTS

WO     WO2008052786 A1    5/2008
WO     WO2012160417 A1    11/2012

OTHER PUBLICATIONS

Mark Nachman, "IBM Tech Uses Hard Drives to Predict Earthquakes", PC Mag.com, http://www.pcmag.com/article2/0,2817,2371337,00.asp, Oct. 22, 2010, 4 pages.

IBM, "Earthquake early warning system", IP.com No. IPCOM000176105D, Nov. 6, 2008, 4 pages.

Hirata Kazushige, "Information Processing Device and Head Retraction Method" English Abstract Translation JP2011233197A, Nov. 17, 2011, 14 pages.

Kosuke Ishizaka, "The information processing device, method, and, computer program" English Abstract Translation JP2014081223A, May 8, 2014, 17 pages.

Mark Nachman, "IBM Tech Uses Hard Drives to Predict Earthquakes", PCmag.com, Oct. 22, 2010, 4 pages.

Jeremy Hsu "'Quake Catcher' Software Converts Laptops Worldwide into Earthquake Sensor Network", Popular Science, Magazine, CES 2014, http://www.popsci.com/technology/article/2010-03/quake-catcher-software-converts-thousands-laptops . . . , Mar. 12, 2010, 3 pages.

Heindle, "Earthquake Warning System With Distributed Hard Discs in the Internet", English Abstract WO2008052786A1, May 8, 2008, 5 pages.

* cited by examiner

PRO-ACTIVE PROTECTION OF COMMUNICATION DEVICES THAT ARE SENSTIVE TO VIBRATION OR SHOCK

BACKGROUND

1. Field of the Invention

The present invention relates to systems and methods for protecting vibration-sensitive communication devices against damage during transient vibration or shock events.

2. Background of the Related Art

Hard disk drives are a common component of computer systems because these devices are able to store large amounts of data in a low cost and efficient manner without loss of data when power is turned off. For example, a modern hard disk drive may store multiple terabytes of data in a small form factor, such as 4 inches wide, 6 inches deep and only 0.8 inches thick.

A typical hard disk drive has one or more disks or platters with a thin film of a ferromagnetic material. Data is stored as changes in the direction that the ferromagnetic material is magnetized. A read-write head is positioned close to the surface of the disk in order to modify magnetization of the material (i.e., write data) and detect magnetization of the material (i.e., read data previously written). Rapid and controlled positioning of the read-write head is achieved by mounting the platters on a spindle that can rotate at thousands of rotations per minute and mounting the read-write head on an actuator arm that extends across the platter at a variable position controlled by an actuator. Disk drives having multiple platters will typically have one read-write head for each platter.

The number and types of mechanical parts, the rapid data response times, the very tight physical tolerances and the sensitivity of the ferromagnetic materials that are needed for a hard disk drive to function also make the hard disk drive more vulnerable to damage. In particular, a hard disk drive can experience damage and data loss as a result of be subjected to vibration or shock. Efforts to design vibration-resistant and shock-resistant mounting systems and enclosure are not able to prevent all types and magnitudes of vibration or shock.

BRIEF SUMMARY

A further embodiment of the present invention provides an apparatus comprising a communication device. The communication device includes a vibroscope or an accelerometer for detecting vibration or shock, a hard disk drive for storing data, and a wireless communication transceiver. In response to detecting vibration or shock, the communication device automatically broadcasts an alert message that identifies a physical location of the communication device at the time that the vibration or shock is sensed. In response to receiving an alert message from another communication device, the communication device automatically temporarily parks a read-write head of the hard disk drive to prevent damage from the vibration or shock.

DETAILED DESCRIPTION

Figure 1:
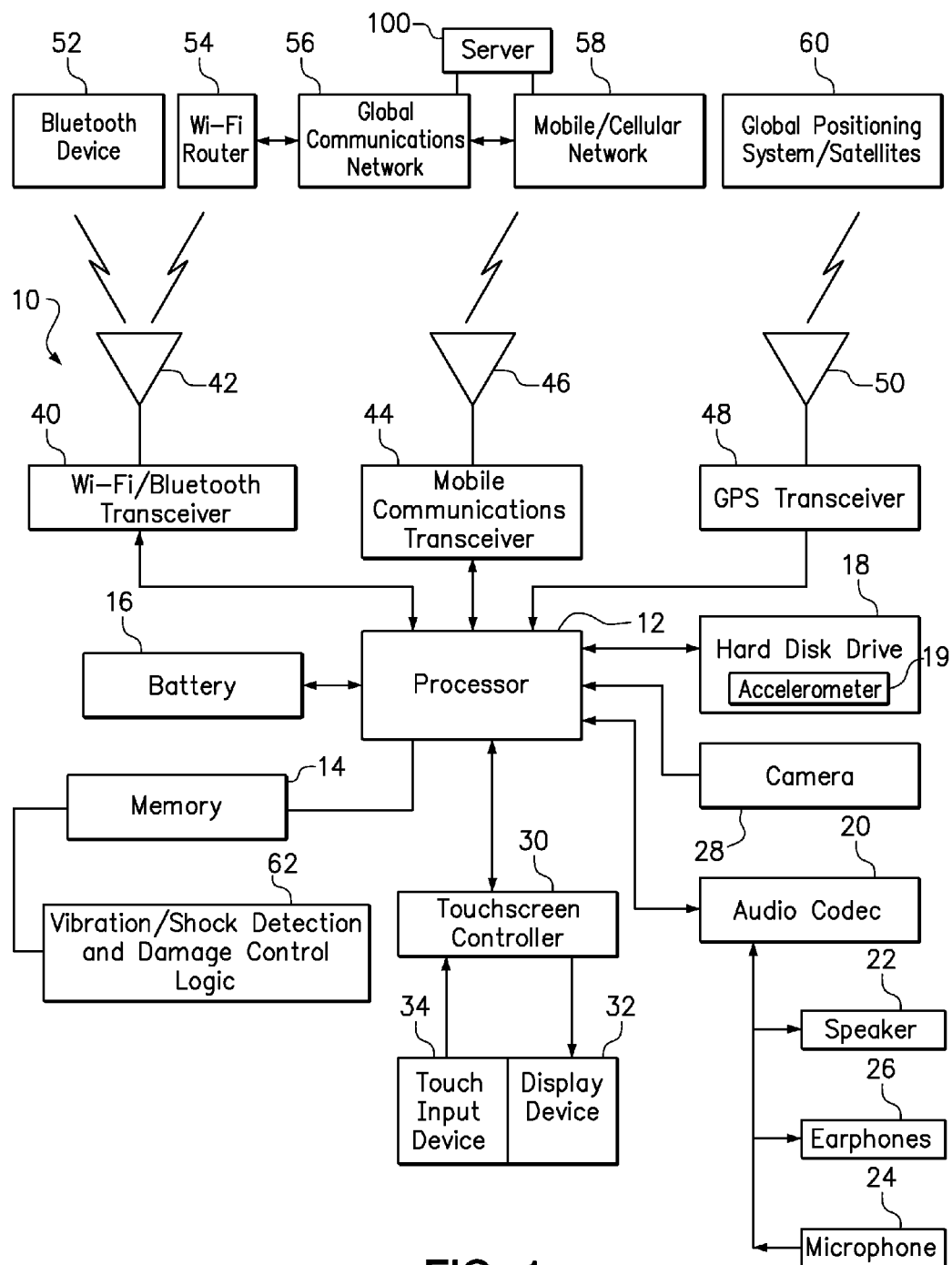
FIG. 1 is a diagram of a mobile communications device.

One embodiment of the present invention provides a method comprising a first communication device detecting vibration or shock, and, in response to detecting vibration or shock, the first communication device broadcasting an alert message that identifies a physical location of the first communication device at the time that the vibration or shock was sensed. The method further comprises a second communication device receiving the alert message, wherein the second communication device includes a hard disk drive that can be damaged by vibration or shock. In response to receiving the alert message, the second communication device temporarily parks a read-write head of the hard disk drive to prevent damage from the vibration or shock, wherein the second communication device parks the read-write head without the second communication device independently detecting the vibration or shock.

The first communication device may, without limitation, be a mobile phone, mobile computer, or desktop computer. However, the first communication device must be able to detect vibration or shock, which may be detected with a vibroscope or an accelerometer. A vibroscope or accelerometer may take the form of a piezoelectric, piezoresistive and capacitive components that may be used to convert mechanical motion into an electrical signal. Such devices may be implemented as a micro electro-mechanical system (MEMS). The first communication device preferably senses the vibration or shock with an internal MEMS-based accelerometer.

The second communication device may include, but is not required to include, components for detecting vibration or shock. Where the second communication device is capable of detecting vibration or shock, the second communication device may function as a first communication device for broadcasting alert messages identifying detected vibration or shock, and may be able to independently detect when the vibration or shock has abated. However, regardless of whether the second communication device can detect vibration or shock, the second communication device must be capable of receiving the alert message in order to timely park a read-write head of a hard disk drive that forms part of the second communication device. It should be recognized that parking the read-write head in the second communication device prior to the second communication device detecting vibration or shock, prevents the read-write head from damaging the platters that store data. While the second communication device may, without limitation, be a mobile phone, mobile computer, or desktop computer, the second communication device will typically not be a mobile phone since most mobile phones do not include hard disk drives.

The first communication device is said to "broadcast" a message (i.e., an alert message or a detection message) in the sense that the first communication device transmits or sends the message to the second communication device without necessarily knowing the identity of the second communication device or that there is a second communication device that will necessarily receive the message. However, the message may be broadcast using any one or more communication protocols including, without limitation, near-field communication protocols, wireless communication protocols, and local area network and Internet protocols. Accordingly, the messages may be sent and received over a wireless network, wired network or a network including a combination of wireless and wired connections or switches.

The alert message should indicate that vibration or shock has been detected at a specific physical location. The alert message may include more information, such as the magnitude of the shock or the frequency and amplitude of the vibration. Still further, if the first communication device has detected the vibration or shock and then determined that the vibration or shock has abated, then the alert message may include a duration of the vibration or shock event. If the alert message includes a duration, then the second communication device may keep the read-write head parked for a similar amount of time. Preferably, the read-write head would be parked for a period of time beginning just prior to the second communication device experiencing the vibration or shock and ending just after the vibration or shock has abated. Optionally, the read-write head may be parked for a period of time equal to the identified duration plus some safety margin.

In one embodiment, the method may further comprise the second communication device, in response to receiving the alert message, temporarily caching data writes in a data storage device that does not rely upon moving mechanical components. In a more specific implementation, the method may further comprise the second communication device, in response to receiving the alert message, temporarily turning on write back cache on the hard disk drive itself. For example, a hard disk drive may normally utilize onboard DRAM as a read cache, but not as a continuous "Write Back" cache due to long term risk of data loss. "Write Back" cache will commit data to the DRAM prior to moving a final copy onto the actual non-volatile storage media to allow for better performance. The reason for not continuously using "Write Back" cache is that an unexpected shutdown of the system could result in complete loss of the data in the cache if that data doesn't get transferred over to the non-volatile memory prior to power dropping so low that the device can't work. In this example "Write Back" cache can be turned off normally, but the device can make the decision to turn Write Back cache on when vibration or shock is expected as the result of receiving an alert message. Turning on the Write Back cache allows the device to continue working even as the heads are parked for a few milliseconds by temporarily utilizing the cache memory as a storage location for writes. Write performance won't affected because writes aren't interrupted during the event. Furthermore, there isn't a high risk of data loss with unprotected write back cache, since the Write Back cache is only used in very short rare events as opposed to being on all the time for all write events In accordance with one optional feature, the second communication device may detect vibration or shock of the second communication device, and then unpark the read-write head after the vibration or shock has dropped below a threshold level. In other words, the second communication device may receive an alert message providing advance warning of vibration or shock, but the second communication device may have the capability to make its own determination about when the vibration or shock has abated to the point that it is safe to resume normal use of the hard disk drive.

The physical location of the first communication device at the time that the vibration or shock was sensed may be identified by global positioning system (GPS) coordinates. Of course, GPS coordinates are only available if the first communication device includes a GPS receiver. Alternatively, the physical location of the first communication device may be identified by the physical location of a network connection point, such as a wireless switch, that is in direct communication with the first communication device. This network connection point may be either a wired or wireless connection point, but the location of the network connection point should be known. For example, the network connection point may be wired connection in an office or hotel room, a wireless (WiFi) connection in a coffee shop, or a cellular communication tower. If the alert message or detection message received from the first communication device by one of these connection points, the physical location of the first communication device may be approximated to be the same physical location as the connection point. While this may not be as accurate as using GPS coordinates, it may be sufficiently accurate for many types of vibration or shock events.

The method may optionally further comprise the second communication device determining a time period until the second communication device will reach the physical location identified in the alert message. The second communication device may do this having received the physical location of the vibration or shock and by determining its own position and current movement, or an intended route being traveled. Alternatively, the second communication device may determine its own fixed location and determine an expansion of an area where the vibration or shock is occurring, such as by receiving alert message from multiple communication devices. Furthermore, a determination of a time period until the second communication device will reach the physical location identified in the alert message, may include a determination of a current physical location, speed and direction of the second communication device. Various types of determinations and calculations may be facilitated by recording the physical location of the vibration or shock in a database of a computer server that is accessible to other communication devices.

Various embodiments of the present invention may be used to prevent damage to hard disk drives through various vibration or shock events. Without limitation, the vibration or shock may be produced by an earthquake, passing heavy equipment, rough patches in a road or train rail, or an explosion.

Another embodiment of the present invention provides a method comprising a first plurality of communication devices detecting vibration or shock, and each of the first plurality of communication devices, in response to detecting vibration or shock, broadcasting a detection message that identifies a physical location of the communication device at the time that the vibration or shock was sensed. The method further comprises a computer server receiving the detection message from each of the first plurality of communication devices, and sending an alert message to each of a second plurality of communication devices. Furthermore, each of the second plurality of communication devices receive the alert message, wherein each of the second plurality of communication devices includes a hard disk drive that can be damaged by vibration or shock. In response to receiving the alert message, each of the second plurality of communication devices temporarily parking a read-write head of the hard disk drive to prevent damage from the vibration or shock, wherein each of the second plurality of communication devices park the read-write head without to the communication device independently detecting the vibration or shock.

In one option, the computer server may use the detection messages to determine an area affected by the vibration or shock. Accordingly, for each of the second plurality of communication devices, the computer server may determine the current physical location of the second communication device and determine whether the second communication device will be entering the affected area. Still further, it is possible for the computer server to determine whether the affected area is stationary, mobile, expanding or contracting.

In another option, the detection message may identify the time that the vibration or shock was detected. Accordingly, if each of the second plurality of communication devices reports to the computer server a time that the alert message was received, then the computer server may determine a time delay between one of the first communication devices detecting shock or vibration and one of the second communication devices receiving the alert message. Knowing the time delay allows a system to tune or adjust the time at which the read-write head should be parked.

Embodiments of the present invention may also take the form of computer program products including computer readable program instructions for implementing or initiating any one or more aspects of the methods described herein. Accordingly, a separate description of the methods will not be duplicated in the context of a computer program product.

A further embodiment of the present invention provides an apparatus comprising a communication device. The communication device includes a vibroscope or an accelerometer for detecting vibration or shock, a hard disk drive for storing data, and a wireless communication transceiver. In response to detecting vibration or shock, the communication device automatically broadcasts an alert message that identifies a physical location of the communication device at the time that the vibration or shock is sensed. In response to receiving an alert message from another communication device, the communication device automatically temporarily parks a read-write head of the hard disk drive to prevent damage from the vibration or shock. The communication device preferably includes a global position system transceiver for automatically detecting the physical location of the communication device.

FIG. 1 is a block diagram of the components in one example of a mobile communication device 10, such as a smart phone or laptop computer, capable of implementing embodiments of the present invention. The block diagram may be representative of any one or more mobile communication device in accordance with various embodiments of the present invention. The communication device 10 may include a processor 12, memory 14 that stores vibration/shock detection and damage control logic 62, a battery 16, a hard disk drive 18 including an accelerometer 19 capable of detecting vibration and/or shock, a camera 28, and an audio codec 20 coupled to a speaker 22, a microphone 24, and an earphone jack 26. The communication device 10 may further include a touchscreen controller 30 which provides a graphical output to the display device 32 and receives an input from a touch input device 34. Collectively, the display device 32 and touch input device 34 may be referred to as a touchscreen.

The communication device 10 may also include a Wi-Fi and/or Bluetooth transceiver 40 and corresponding antenna 42 allowing the device to communicate with a Bluetooth device 52 or a Wi-Fi router 54, a mobile communication transceiver 44 and corresponding antenna 46 allowing the device to communicate over a mobile/cellular network 58, and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet. Furthermore, a server 100 may be running server application logic for receiving detection messages from various communication devices and sending alert (instruction) messages to other communication devices, where the server 100 may be accessed by the mobile communication device 10 through the global communications network 56 and/or the mobile/cellular network 58.

Figure 2:
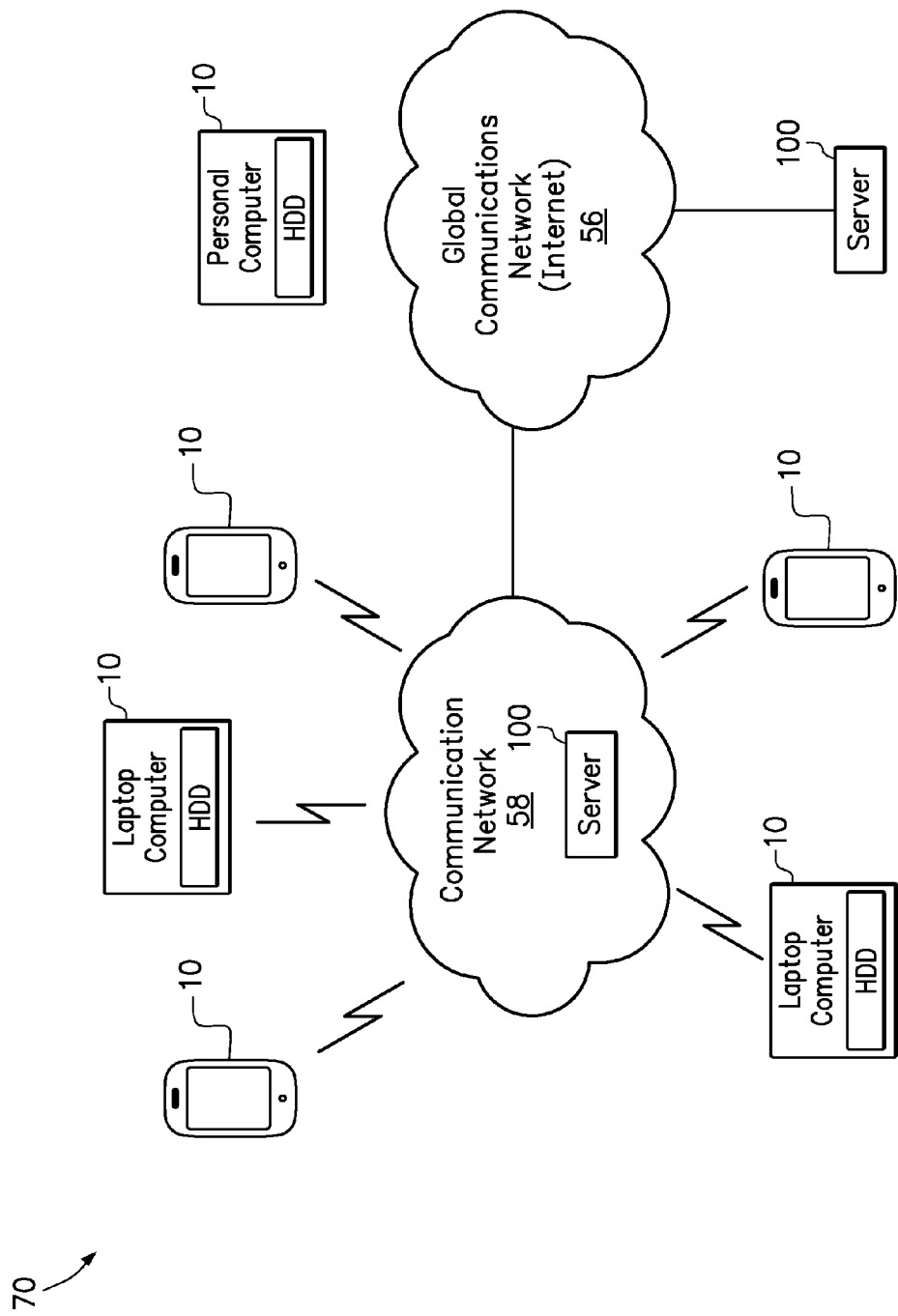
FIG. 2 is a diagram a plurality of mobile communication devices that may communicate over a communication network with a photo-sharing service.

FIG. 2 is a diagram of a system 70 including a communication network 58 enabling communication between a plurality of communication devices 10, optionally including both mobile phones, mobile laptop computers, and other personal computers. The communication network 58 may include the server 100 or be in communication with the server 100 over a global communications network 56, such as the Internet. Alternate servers 100 are shown in different locations, but only one server is needed to implement embodiments of the present invention that utilize a server. The server 100 may provide one or more services to the communications devices, but may implement one or more steps of the methods or one or more functions of the program instructions of the present invention. In one non-limiting example, the server 100 may receive detection alert messages from one or more of the mobile communication devices 10 that are detecting vibration or shock and send alert messages to other mobile communication devices 10 that have hard disk drives that may be affected by the vibration or shock.

Figure 3:
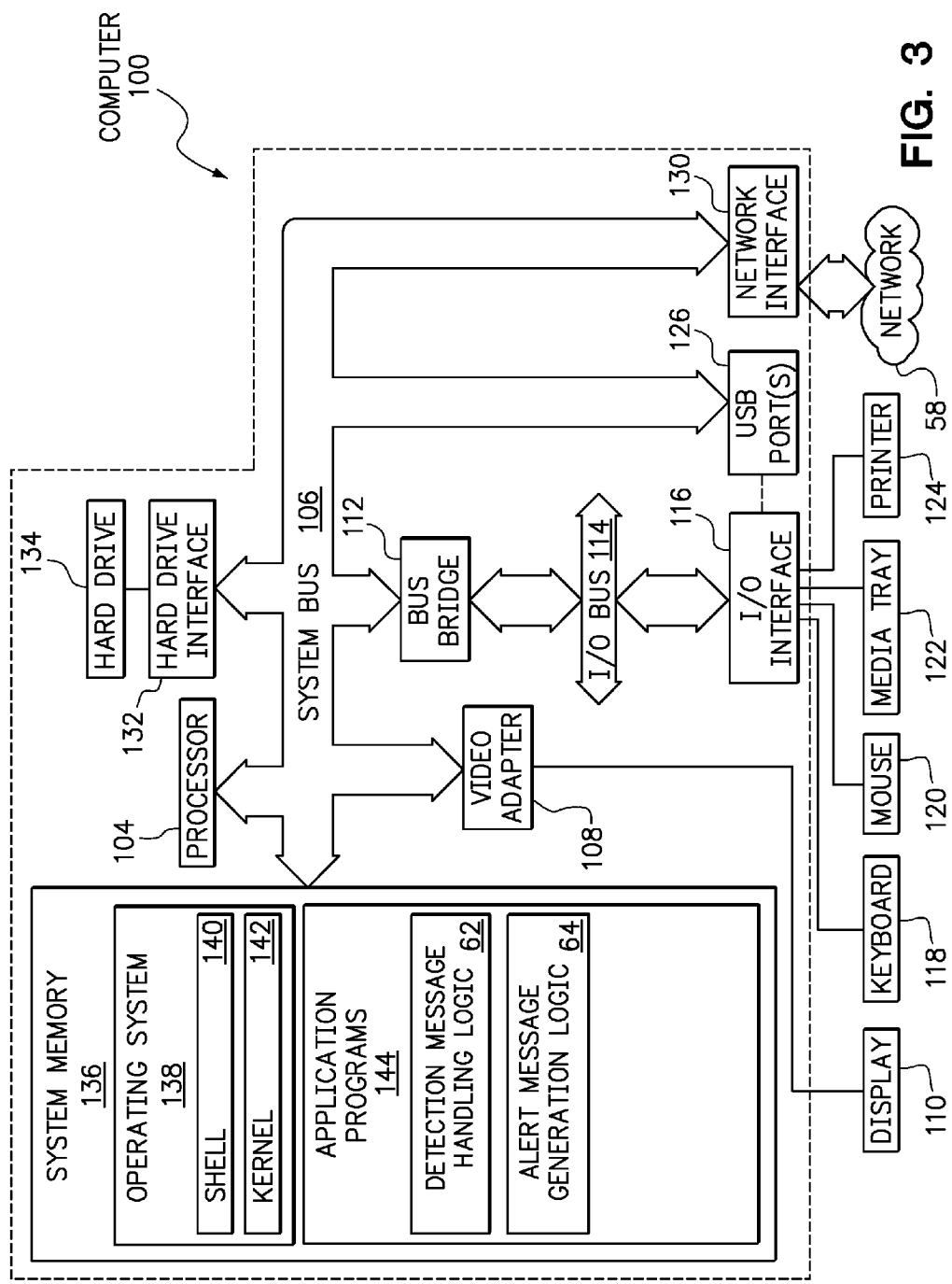
FIG. 3 is a diagram of a computer that may implement a photo-sharing service.

FIG. 3 is a diagram of an exemplary compute node or server (or simply "computer") 100 that may be utilized as the server 100, but the hardware might also be representative of another communication device. The computer 100 includes a processor unit 104 that is coupled to a system bus 106. Processor unit 104 may utilize one or more processors, each of which has one or more processor cores. A video adapter 108, which drives/supports a display 110, is also coupled to the system bus 106. The system bus 106 is coupled via a bus bridge 112 to an input/output (I/O) bus 114. An I/O interface 116 is coupled to I/O bus 114 and affords communication with various I/O devices, including a keyboard 118, a mouse 120, a media tray 122 (which may include data storage devices such as CD-ROM drives, multi-media interfaces, etc.), a printer 124, and USB port(s) 126. While the format of the ports connected to I/O interface 116 may be any format known to those skilled in the art of computer architecture, in a preferred embodiment some or all of these ports are universal serial bus (USB) ports. As depicted, the computer 100 is able to communicate over a network 58 using a network interface 130. The network 58 may be an external network such as the cellular network or global communication network 56, and perhaps also an internal network such as an Ethernet network or a virtual private network (VPN).

A hard drive interface 132 is also coupled to the system bus 106 and provides an interface with a hard disk drive 134. In a preferred embodiment, the hard drive 134 populates a system memory 136, which is also coupled to the system bus 106. System memory is defined as a lowest level of volatile memory in computer 100. This volatile memory includes additional higher levels of volatile memory (not shown), including, but not limited to, cache memory, registers and buffers. Data that populates the system memory 136 includes an operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for the OS 138, including providing essential services required by other parts of OS 138 and application programs 144, including memory management, process and task management, disk management, and mouse and keyboard management. The application programs 144 in the system memory of computer 100 may include various programs and modules for implementing the methods described herein, such as the detection message handling logic 62 (for handling detection messages received from various communication devices) and alert message generation logic 64 (for sending alert messages to identified communication devices).

The hardware elements depicted in the computer 100 are not intended to be exhaustive, but rather are representative components suitable to perform the processes of the present invention. For instance, the computer 100 may include additional memory storage devices such as magnetic cassettes, digital versatile disks (DVDs), Bernoulli cartridges, and the like. These and other variations are intended to be within the spirit and scope of the present invention.

Figure 4:
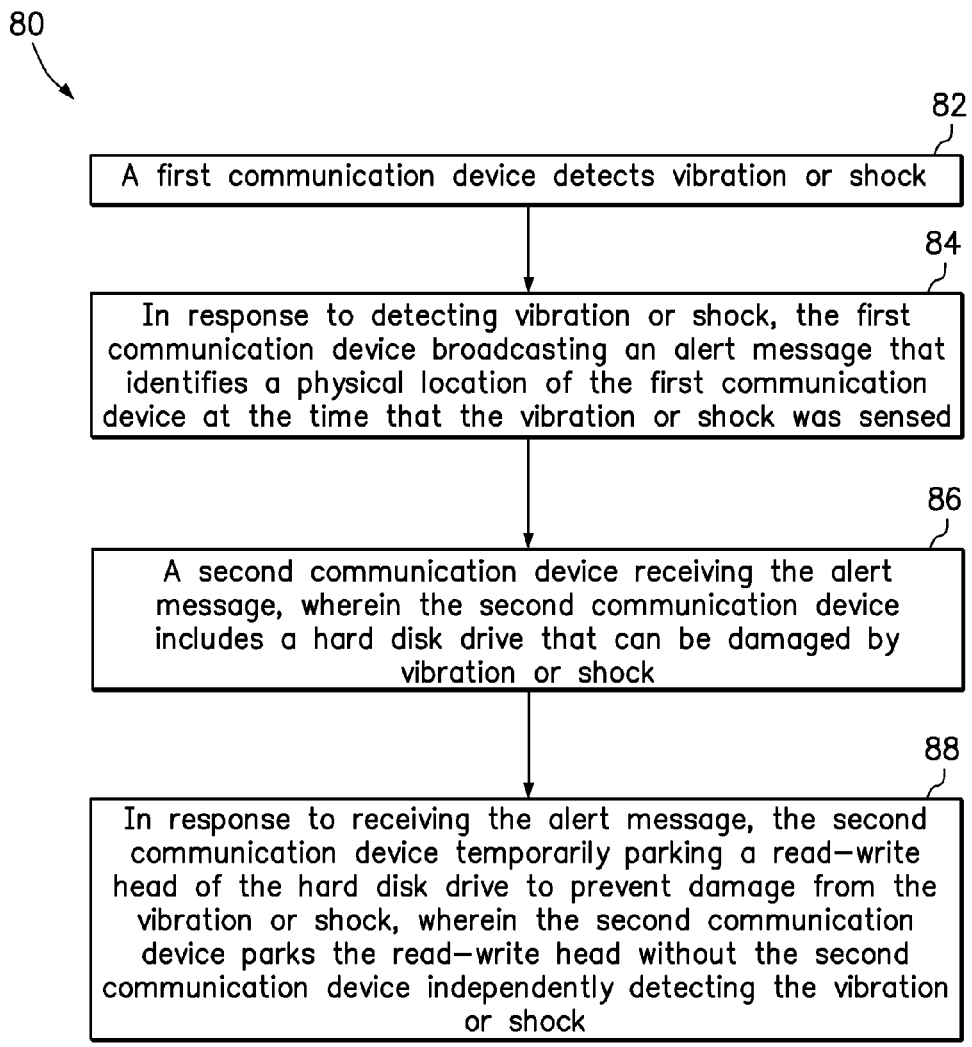
FIG. 4 is a flowchart of a method in accordance with one embodiment of the present invention.

FIG. 4 is a flowchart of a method 80 in accordance with one embodiment of the present invention. In step 82, a first communication device detects vibration or shock. In step 84, in response to detecting vibration or shock, the first communication device broadcasts an alert message that identifies a physical location of the first communication device at the time that the vibration or shock was sensed. In step 86, a second communication device receives the alert message, wherein the second communication device includes a hard disk drive that can be damaged by vibration or shock. In step 88, in response to receiving the alert message, the second communication device temporarily parks a read-write head of the hard disk drive to prevent damage from the vibration or shock, wherein the second communication device parks the read-write head without the second communication device independently detecting the vibration or shock.

Figure 5:
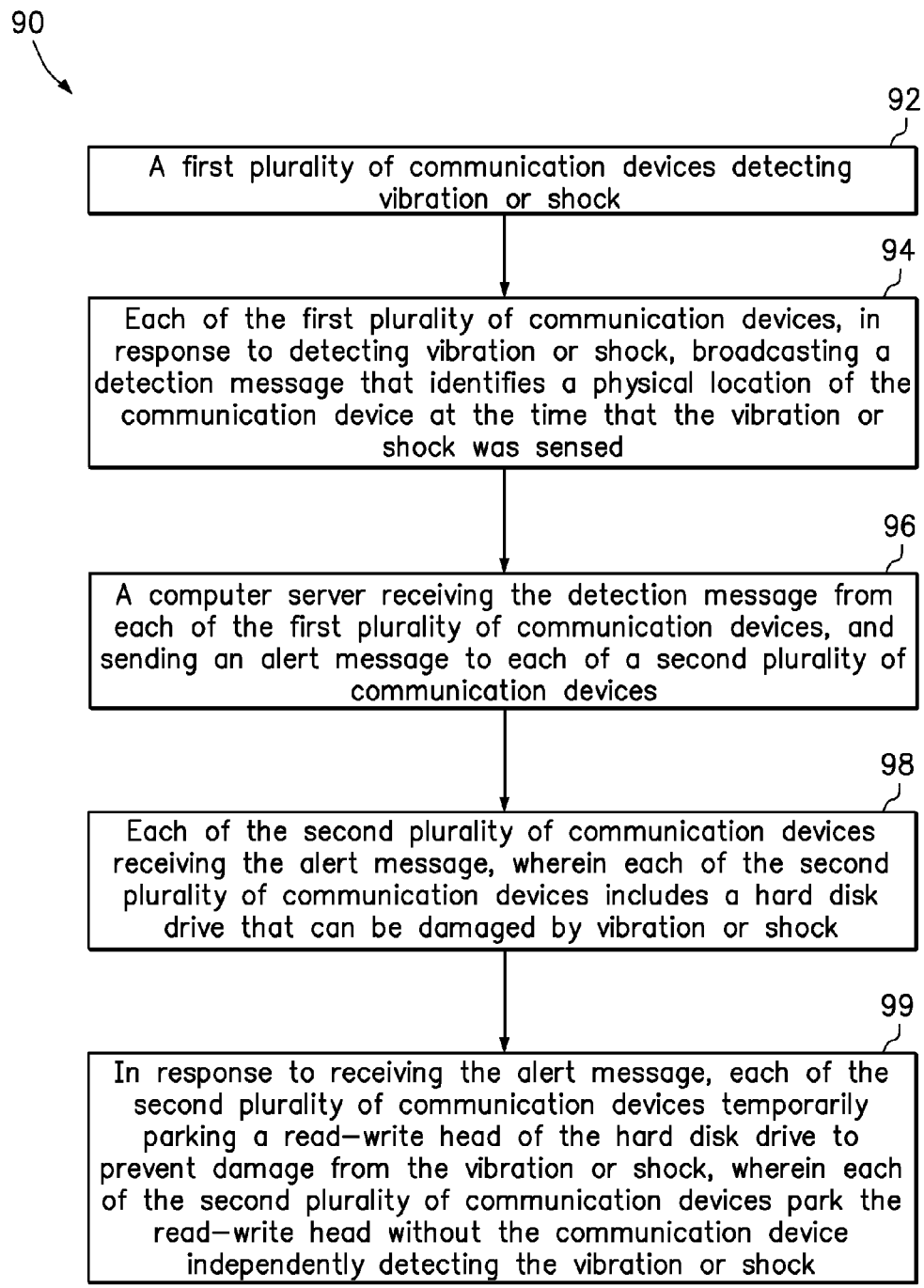
FIG. 5 is a flowchart of a method in accordance with another embodiment of the present invention.

FIG. 5 is a flowchart of a method 90 in accordance with another embodiment of the present invention. In step 92, a first plurality of communication devices detecting vibration or shock. In step 94, each of the first plurality of communication devices, in response to detecting vibration or shock, broadcast a detection message that identifies a physical location of the communication device at the time that the vibration or shock was sensed. In step 96, a computer server receives the detection message from each of the first plurality of communication devices, and sends an alert message to each of a second plurality of communication devices. In step 98, each of the second plurality of communication devices receives the alert message, wherein each of the second plurality of communication devices includes a hard disk drive that can be damaged by vibration or shock. In step 99, in response to receiving the alert message, each of the second plurality of communication devices temporarily parks a read-write head of the hard disk drive to prevent damage from the vibration or shock, wherein each of the second plurality of communication devices park the read-write head without the communication device independently detecting the vibration or shock.

Working Example 1

Figure 6:
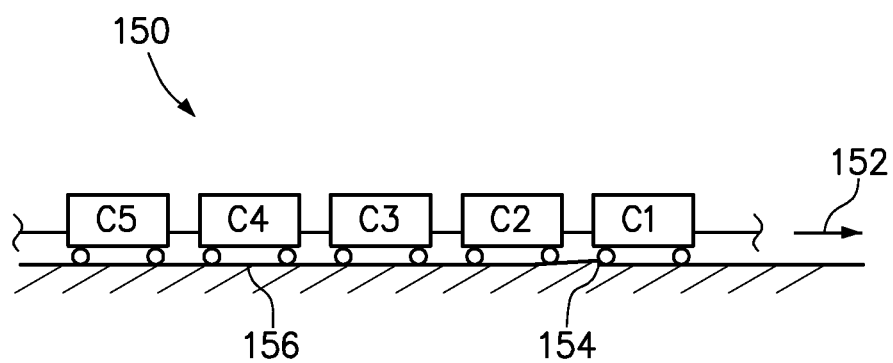
FIG. 6 is a diagram of several cars of a commuter train traveling down a track that includes a bump.

In reference to FIG. 6, commuters are on a train 150 on their way to work (see left-to-right direction of travel indicated by the arrow 152). The cars of the train are labeled C1-C5 from the front of the train to the back. The train 150 rides on a track 156 that includes a bump 154. As the train continues moving forward the cars will encounter the bump 154 in order. As shown, car C1 has already passed the bump 154, and car C2 is about to experience the bump. After that, the cars C3-C5 will encounter the bump 154 in sequential order and with a time delay according to the speed of the train and the length of each car.

Figure 7:
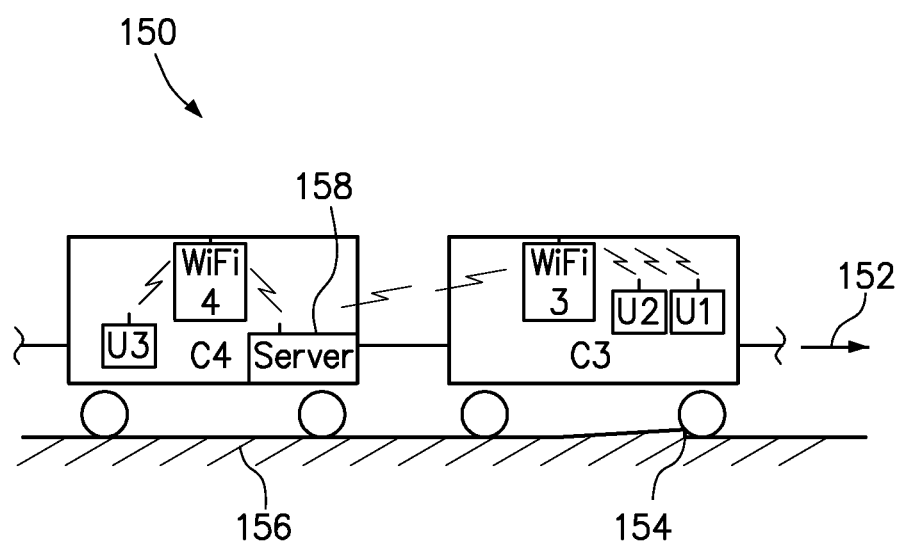
FIG. 7 is a diagram of only cars C3 and C4 from FIG. 6.

FIG. 7 is a diagram of only cars C3 and C4 from FIG. 6. Two of the commuters (User 1 "U1" and User 3 "U3") are using their laptops computers and one commuter (User 2 "U2") is using a mobile phone. U1 (laptop computer) and U2 (mobile phone) are in car C3 of the train 150, and U3 (laptop computer) is in car C4. As the train moves forward in the direction of the arrow 152, car C3 goes over the rough railway junction (bump 154) in the rails 156 that jars the train car enough so that the accelerometer in both the laptop (U1) and the mobile phone (U2) detect a shock. These two devices (U1 and U2) send out an immediate alert message to other communication devices that may pass through the same physical location where the vibration or shock was detected. The alert message may include GPS coordinates of the physical location where the vibration or shock was detected. Upon receiving the alert message, the laptop (U3) in car C4 is made aware of the impending shock and may park a read-write head of a hard disk drive in the laptop. Receipt of the alert message allows the read-write head to be parked proactively for a period of time that suits the duration of the event or until the laptop (U3) has passed the physical location where the shock was detected.

If the communication devices (U1, U2 and U3) do not have GPS capabilities, the physical location of each device may be determined by which connection point on the train is providing network services to the device. For example, each car of the train may have its own network switch or a WiFi hub ("connection point") that can be used by the communications devices within a particular train car. Accordingly, U1 and U2 are found to be communicating through a WiFi hub in car C3 (i.e., "WiFi 3") of the train, and U3 is found to be communicating through a WiFi hub in car C4 (i.e., "WiFi 4") of the train. Therefore, the physical locations of U1 and U2 are determined to be car C3 (in the absence of GPS data) and the physical location of U3 is determined to be car C4. In one option, an application running on a server 158 aboard the train can provide data to the network informing each communication device (U1, U2 and U3) of the train's current speed and the distance between each of the individual rail cars in order to allow for precise timing of when the bump 154 will affect the laptop (U3) in car C4. Ultimately, since devices U1 and/or U2 detect the shock and send a detection message to the WiFi 3 connection point, and an alert message is forwarded through the network to device U3 in car C4, device U3 is able to park the read-write head(s) of its hard disk drive prior to experiencing a shock causes by the bump 154.

Working Example 2

Figure 8:
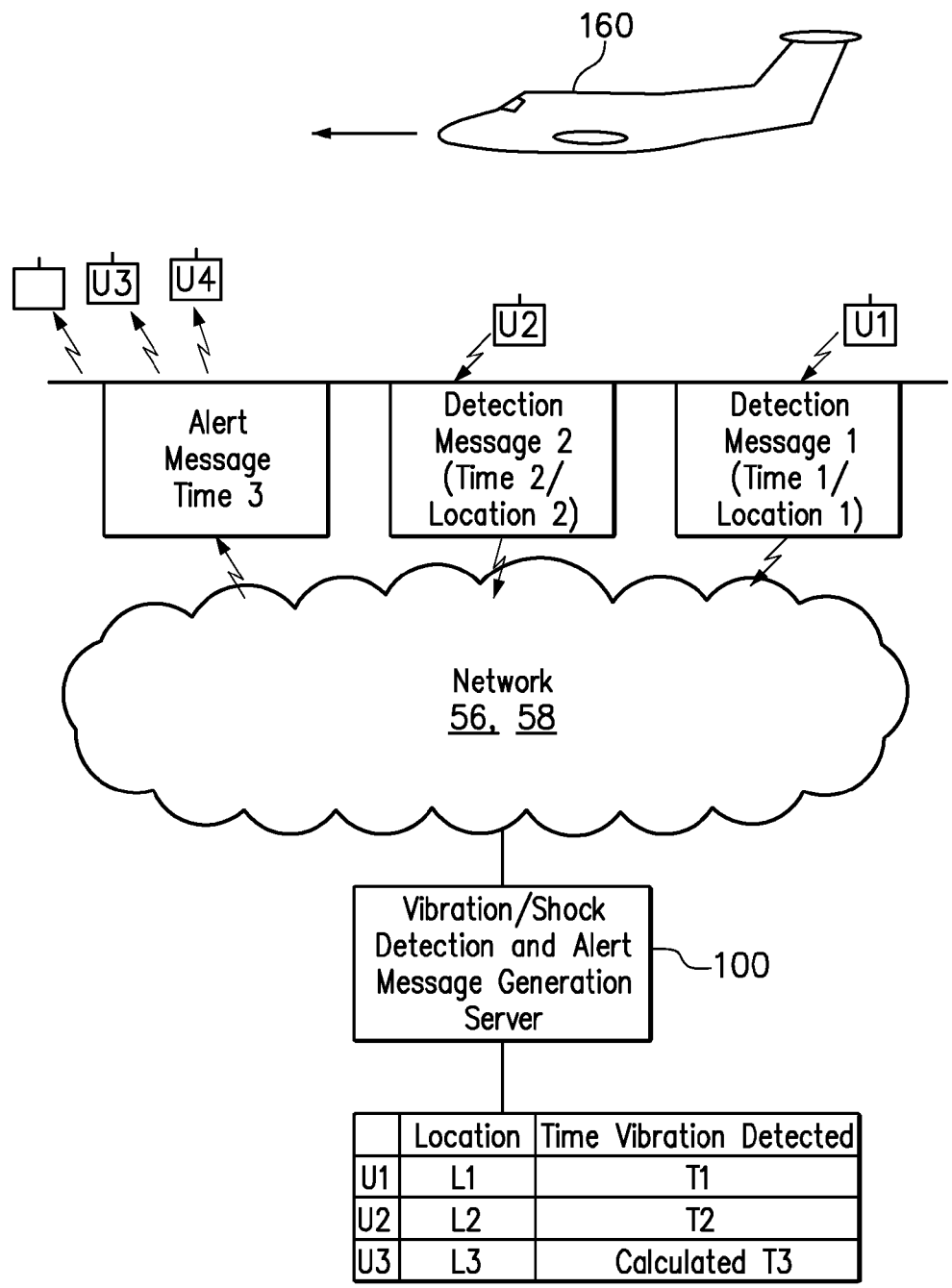
FIG. 8 is a diagram of a low flying jet causing potentially damaging levels of vibration to devices along its path.

FIG. 8 is a diagram of a low flying jet 160 causing potentially damaging levels of vibration to devices along its path.

The jet has already flown over a first device U1, resulting in U1 detecting the vibration and sending out a detection message (Detection Message 1), which identifies the time (Time 1) and physical location (Location 1) of the first device U1 at which the vibration was detected. Optionally, the detection message may further identify the duration of the vibration, if known. However, the detection message should be sent out immediately, such that the duration may not yet be determinable.

As shown, the second device U2 has just detected vibration and has also sent out a detection message (Detection Message 2), which identifies the time (Time 2) and physical location (Location 2) of the second device U2 at which the vibration was detected. The detection messages are communicated through the network 56, 58 to a server 100 (Vibration/Shock Detection and Alert Message Generation Server). The server 100 uses the data received in Detection Message 1 and Detection Message 2, as well as the known location of the third device (U3) to determine whether U3 will be affected by the vibration. The server 100 may use various mathematical models, which may be as simple as an estimation assuming a linear path of the jet or knowing jet approach and landing lanes near an airport. However, an alert message may be broadcast to any communication device that is determined to have a potential for damage as a result of the vibration. As shown, the Alert Message is broadcast to U3, U4 and other devices in the path of the jet. The Alert Message may be broadcast, for example, to every device that is connecting to the network 56, 58 through a given connection point or every device that is currently located within a range of GPS coordinates.

While the present example is directed to a jet moving along a path, it should be recognized that various communication devices may similarly detect vibrations from an earthquake and send detection messages identifying the location where the vibration was detected. This would result in alert messages being broadcast to yet other communication devices that would park their hard disk drives prior to actually experiencing the vibrations. The primary difference in the method used to prevent damage from an earthquake and the method used to prevent damage from a low flying jet is that the earthquake vibrations will likely be detected by a greater number of devices over a much larger area, and the vibrations will emanate outwardly in many directions rather than along a specific path.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
a communication device including a vibroscope or an accelerometer for detecting vibration or shock, a hard disk drive for storing data, and a wireless communication transceiver, wherein the communication device, in response to detecting vibration or shock, automatically broadcasts an alert message that identifies a physical location of the communication device at the time that the vibration or shock is sensed, and wherein the communication device, in response to receiving an alert message from another communication device, automatically temporarily parks a read-write head of the hard disk drive to prevent damage from the vibration or shock.

2. The apparatus of claim 1, wherein the communication device includes a global position system transceiver for automatically detecting the physical location of the communication device.

3. The apparatus of claim 1, wherein the communication device, in response to detecting the vibration or shock, unparks the read-write head after the vibration or shock has dropped below a threshold amount.

4. The apparatus of claim 1, wherein the communication device further includes write back cache on the hard disk drive, and wherein the communication device, in response to receiving the alert message, temporarily turning on write back cache on the hard disk drive.

5. The apparatus of claim 1, wherein the communication device further includes a data storage device that does not rely upon moving mechanical components, and wherein the communication device, in response to receiving the alert message, temporarily caches data writes in the data storage device.

* * * * *